Sept. 10, 1968      E. S. ALEXANDER      3,400,855

SPILLPROOF CONTAINERS

Filed June 7, 1965

INVENTOR
EDWIN S. ALEXANDER

BY *Joseph C. Redmond*

ATTORNEY

United States Patent Office 3,400,855
Patented Sept. 10, 1968

3,400,855
SPILLPROOF CONTAINERS
Edwin S. Alexander, 26 Deerfield Drive,
Florham Park, N.J. 07932
Filed June 7, 1965, Ser. No. 461,758
2 Claims. (Cl. 220—90.4)

ABSTRACT OF THE DISCLOSURE

This invention relates to containers. More particularly, this invention relates to spillproof containers.

---

Serving beverages in traveling vehicles, for example, ships, planes, trains and the like, presents problems from the pitching and yawing accompanying the traveling action. Invariably, the beverage, due to free surface effect, will respond to the pitching and yawing and spill from a container. The spilled beverage, more often than not, wets the personal attaire of the traveler resulting in aggravation, discomfort and cleaning expense. A container that will not spill due to ordinary traveling motion would improve the comfort and pleasure of travelers.

A general object of the present invention is a spillproof container for traveling vehicles.

One object is a spillproof container that is readily storable.

Another object is a spillproof container that is inexpensive, compact and easy to handle.

These and other objects are accomplished in accordance with the present invention. One illustrative embodiment of which comprises a container and an insertable member, the latter having a periphery that corresponds to the configuration of the inside of the container. The member is fixed in the container by suitable channels and properly shaped not to interfere with the user. The container and the member may be stored separately to facilitate storage.

One feature of the invention is a pluggable baffle, positioned in a container, to be transverse to the forces accompanying the traveling motion, the baffle dampening the free surface effect of liquid in the container to prevent spillage from the cup.

Another feature is a container having a baffle suitably positioned relative to the container handle whereby the free surface effect of a liquid is substantially suppressed by the presence of the baffle.

Still another feature is a container including a hinged flap, normally manufactured folded against the container interior side, and rotatable away from the interior side to form a baffle to suppress free surface effect in a liquid due to traveling motion.

These and other objects of the invention will be fully apprehended from the following detailed specification taken in conjunction with an appended drawing in which.

Figure 1:
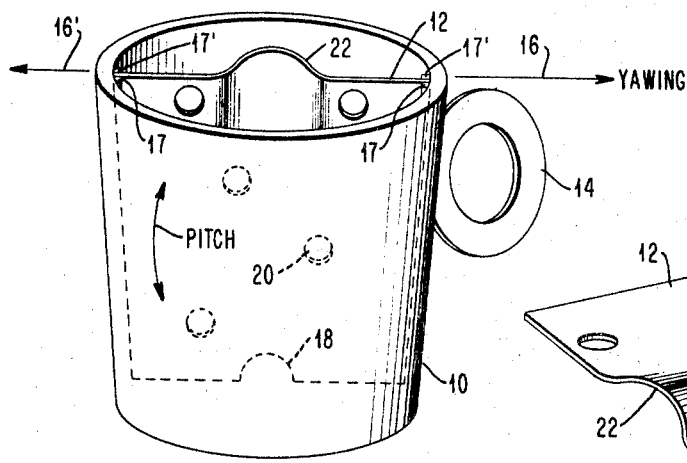
FIG. 1 is an isometric view of the embodiment of a spillproof container employing the principles of the present invention.
Figure 1B:
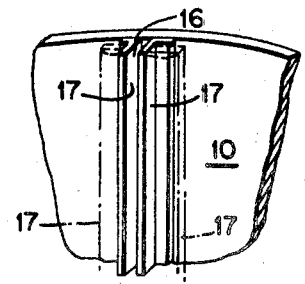
FIG. 1B is an enlarged view, partly in section showing the channel members secured to the interior of the container.

In FIG. 1 a conventional paper, plastic or like container 10 includes a pluggable baffle member 12 for suppressing the free surface effect of a liquid or beverage which may be served in the container. FIG. 1 is only intended to be illustrative of varying types and sizes of containers which may be used for serving beverages. A handle 14 is suitably attached to the side of the container. The handle may normally be folded against the side of the container and rotated to a perpendicular position after removal of the paper container from storage. Manifestly, it is apparent that the handle is only intended to be illustrative of those which are presently available in the commercial market.

The baffle, in one form, may be plastic or like and have a periphery minutely larger than the interior of the container. When the baffle is urged inside the container in a suitable position, described hereinafter, the compressional forces developed in the baffle will hold it securely positioned in the container.

In another form, the interior of the container includes diametrically opposed channels 16–16′. Each channel comprises flap members 17 and 17′ which are hinged to the side of the container. Normally each flap member is folded back to be tangential to the interior of the container. The direction of folding is opposite for the flaps 17 and 17′. The paper or plastic comprising the flaps is selected to have a stiffness to remain in the extended position once unfolded. The spacing between the flaps in the extended position is of the order of $\frac{1}{32}''$ to accommodate the insertable member 12 in a friction joint. It is apparent that more than one set of diametrically opposed set of flaps may be located in the container. This will facilitate the proper location of the member 12, fr reasons more apparent hereinafter.

Figure 1A:
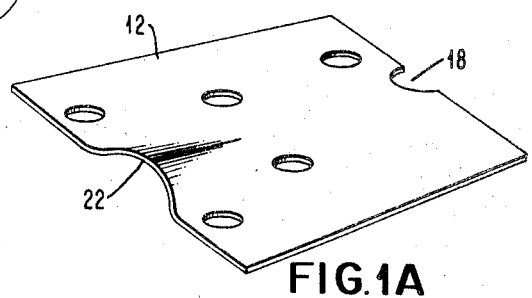
FIG. 1A is a plan view of an insertable member employed in FIG. 1.

The member 12, shown in FIG. 1A, has a periphery which conforms to that of the interior configuration of the container. The material for the member may be paper, plastic or like. A notch 18 is provided at the base of the member 12. The notch permits the temperature of the liquid to be evenly distributed. Additional apertures or holes 20 may be randomly located in the member for a similar purpose. The upper edge of the member 12 is appropriately shaped to prevent conflict between the nose of a person using the container. In one form an arcuate portion 22 is included in the member 12. In another form a notch similar to that in the lower edge of the member 12 may be employed. It is important, however, that the member 12 terminate in a plane as near to the upper edge of the container 10, as possible. Failure to have the member 12 terminate in this plane will permit the free surface effect of the liquid to be uncontrolled with resulting spillage in the presence of the proper forces. The baffle, at the other end, however, should not come to the bottom of the container. This will prevent stirring when sugar or other additive is added to the liquid.

In still another form, the channels are constructed by fabricating notches in the container at diametrically opposed points. The baffle is suitably shaped to be pluggable in the notches.

The member 12 and the container 16 may be individually stored in stacked relation. This arrangement minimizes storage space which is so important in the case of aircraft. When beverages are to be served, the container and insertable members may be removed from storage and joined together as shown in FIG. 1. The member 12 should be located in diametrically opposed channels to establish a plane transverse to the forces accompanying the traveling motion. For example, the forces accompanying yawing of a vehicle will be perpendicular to the traveling motion. Member 12, being transverse to these forces, will nullify their effect on any liquid in the container. For the forces associated with pitching accompanying the traveling motion, the member 12 should be located as shown in FIG. 1. Conveniently, therefore, the handle 14 may be employed as a reference point for locating the channels 16. The channels should be orthogonally located, one set of channels lying in the plan of the handle. The hostess or stewardess will be able to select the proper channels for receiving the member 12. Simple instructions should suffice for this purpose.

After the member and container have been interconnected as shown in FIG. 1, the beverage may be poured therein. The member 12 permits the beverage to freely circulate. The member 12 provides the equal and opposing force to the pitching or yawing to prevent the beverage, as a noncompressible material, from flowing over the sides of the container. Experiments have shown that the presence of the member 12, properly located, will permit pitching or yawing forces of relatively large magnitude to be applied to the container with no spillage occurring from the container. The absence of the member 12 permitted spillage from the container with substantially little pitching or yawing motion.

Figure 2:
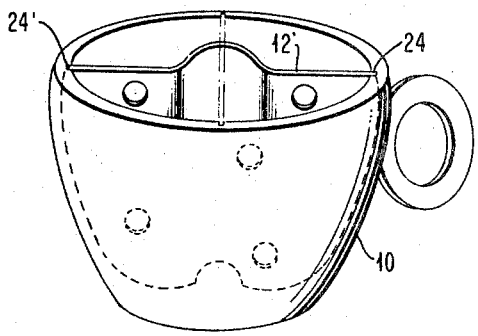
FIG. 2 is an isometric view of another embodiment of a spillproof container.
Figure 2A:
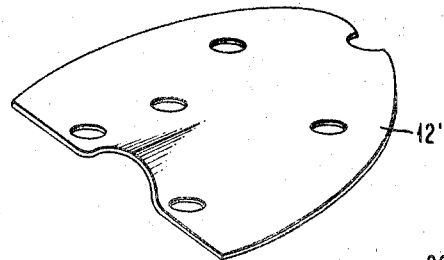
FIG. 2A is a plan view of an insertable member employed in FIG. 2.

FIG. 2 and 2A illustrate plastic containers and insertable members 12 for preventing spillage. Notches or grooves 24–24′ are suitably located in the container at the locations similar to those described in connection with FIG. 1. The member 12 may be plastic, paper or like with a periphery similar to the configuration of the interior of the container-cup 10. When inserted in the grooves 24–24′, the member 12 functions in the manner described in FIG. 1. The width of the notches is selected to be of the order of 99.9% of the member 12 thickness. The smaller notch thickness provides the member 12 with a friction joint sufficient to withstand the pitching and yawing forces. The container 10 and member 12 may be separately stored in stack relation and appropriately joined or interconnected when it is desired to serve a beverage. Further description of the embodiment shown in FIGS. 2 and 2A is not believed necessary in view of the previous description.

Figure 3A:
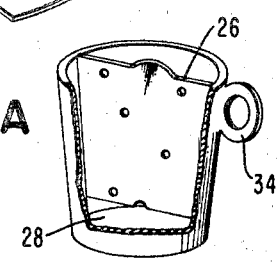
FIG. 3A is a cutaway view of a container showing a hinged baffle rotating away from the container side.
Figure 3:
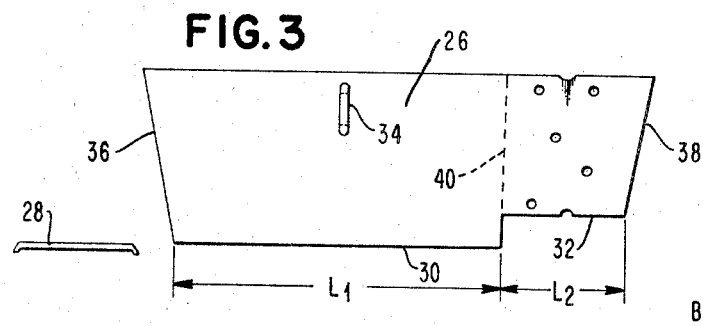
FIG. 3 is a plan view of a paper or plastic member prior to formation into a container.

A unitary container and flap may be fabricated from a strip 26 and a plate 28. The strip includes a first portion 30 which serves as the walls of the container and a second portion 32 which serves as a baffle. The sections 30 and 32 include a handle 34, appropriately located on the exterior for holding the container, are rolled into a frustrum. Before rolling, the member 26 is serrated transversely at a length $L_1$ with respect to edge 36 and at a length $L_2$ with respect to edge 38. The sum of $L_1$ and $L_2$ equals 1 to 3. This ratio is important to insure that the baffle 32 will extend the entire width of the container. After rolling, the edge 36 is united to the reverse side of the strip at the serrations 40. The attachment of the edge 36 to the serrations 40 may be made in any conventional manner described in the container making art. Manifestly, the strip 26 should be rolled to permit the handle to be on exterior of the frustrum or container. The baffle 32, in this configuration, is tangential to the interior. The plate 28 is forced or urged into the bottom of the frustrum to establish a water-proof joint in any conventional manner known in the art. The completed container shown in FIG. 3A may be stored in stack relation.

When a beverage is to be served, the baffle may be rotated from the inside of the container to the appropriate position transverse to the pitching or yawing forces. The width or $L_2$ of the baffle is slightly larger than that of the container interior. Accordingly, a friction joint is established at the intersection which is sufficient to withstand the pitching or yawing forces. The baffle, in all respects, is similar to those described in FIGS. 1A and 2A. However, the need for channels or notches is eliminated.

Various changes may be made in the details of the construction without departing from the spirit and scope of the invention as defined in appended claims.

What is claimed is:

1. A spillproof container comprising a jar having an interior and an exterior surface, at least one set of diametrically opposed and foldable channel members secured to the interior surface, said members normally folded against the interior surface and adapted to be rotated to a position perpendicular to the interior surface, and a baffle member positioned in the channel members after rotation thereof to the perpendicular position.

2. A spillproof container comprising a jar having an interior and an exterior surface, at least one set of diametrically opposed channel members foldable against and secured to the interior, said members adapted to be rotated to a position perpendicular to the interior surface, and a baffle member including at least one notch, an aperture and an arcuate portion, said baffle member frictionally held in the channel member when in the perpendicular position.

References Cited
UNITED STATES PATENTS

| | | | |
|---|---|---|---|
| 2,428,056 | 9/1947 | Wachsman | 220—90.4 |
| 3,079,028 | 2/1963 | Rosher | 220—22 |
| 1,752,137 | 3/1930 | Ahern | 220—22 X |
| 2,362,354 | 11/1944 | Clovis | 220—90.4 |
| 2,428,056 | 9/1947 | Wachsman | 220—90.4 |
| 2,985,333 | 5/1961 | Kirkman | 220—22 |
| 3,079,028 | 2/1963 | Rosner | 220—22 |
| 3,138,371 | 6/1964 | Feher et al. | 229—1.5 X |

FOREIGN PATENTS

| | | |
|---|---|---|
| 502,009 | 3/1939 | Great Britain. |
| 697,496 | 10/1940 | Germany. |

DAVIS T. MOORHEAD, *Primary Examiner.*